(12) United States Patent
Anderson

(10) Patent No.: US 10,669,089 B2
(45) Date of Patent: Jun. 2, 2020

(54) STACKABLE MICROWAVE TOWER

(71) Applicant: Judith Marie Anderson, Crestline, CA (US)

(72) Inventor: Judith Marie Anderson, Crestline, CA (US)

( * ) Notice: Subject to any disclaimer, the term of this patent is extended or adjusted under 35 U.S.C. 154(b) by 386 days.

(21) Appl. No.: 15/794,040

(22) Filed: Oct. 26, 2017

(65) Prior Publication Data
US 2018/0057245 A1    Mar. 1, 2018

Related U.S. Application Data

(62) Division of application No. 14/021,642, filed on Sep. 9, 2013, now Pat. No. 9,809,375.

(60) Provisional application No. 61/852,865, filed on Mar. 25, 2013.

(51) Int. Cl.
| | | |
|---|---|---|
| *B65D 81/34* | (2006.01) | |
| *H05B 6/80* | (2006.01) | |
| *A47J 36/02* | (2006.01) | |

(52) U.S. Cl.
CPC ........ *B65D 81/3453* (2013.01); *A47J 36/027* (2013.01)

(58) Field of Classification Search
CPC ............................ A47J 36/027; B65D 81/3453

USPC ....... 219/734, 725, 730, 732, 735, 762, 763; 99/416, 417, 418, 413, 415, 448, DIG. 14; 126/369, 373, 377; 220/573.4, 573.5, 220/592.05, 912

See application file for complete search history.

(56) References Cited

U.S. PATENT DOCUMENTS

| | | |
|---|---|---|
| 1,793,298 A | 2/1931 | Alaj |
| 4,206,845 A | 6/1980 | Christian |
| 4,847,461 A | 7/1989 | Gilmore |
| 5,387,781 A | 2/1995 | Berkoff |
| 6,255,637 B1 * | 7/2001 | Collett ................. A47J 36/027 219/725 |
| 6,273,284 B1 | 8/2001 | Nottage |
| 7,667,168 B2 | 2/2010 | Smith |
| 2011/0210033 A1 | 9/2011 | Chhay |
| 2011/0233204 A1 | 9/2011 | Townes |

* cited by examiner

*Primary Examiner* — Quang T Van
(74) *Attorney, Agent, or Firm* — Fish & Richardson P.C.

(57) ABSTRACT

A stackable microwave covers including a first food cover that includes a top wall for supporting a first food item and having a particular shape that has a first area, one or more side walls slanted at an outward angle from beneath the top wall, wherein a top of the one or more side walls defines a second area that is smaller than the first area, wherein a bottom edge of the one or more side walls defines a substantially similar shape to the particular shape of the top wall and has a third area greater than the second area and less than the first area, and wherein the top wall and the one or more side walls form a first cavity for positioning a second food item.

15 Claims, 6 Drawing Sheets

STACKABLE MICROWAVE TOWER

CROSS-REFERENCE TO RELATED APPLICATIONS

This application is a divisional of U.S. application Ser. No. 14/021,642, filed Sep. 9, 2013, now allowed, which claims the benefit of U.S. Provisional Application No. 61/852,865, filed Mar. 25, 2013, both of which is incorporated herein in its entirety by reference.

TECHNICAL FIELD

The subject matter of this disclosure relates to stackable microwave towers.

BACKGROUND

Microwave covers allow a user of a microwave cover to prevent residue from the food being covered by the cover and cooked by the microwave oven from spraying or otherwise landing on interior surfaces of the microwave oven.

SUMMARY

In general, the subject matter disclosed herein describes one or more microwave-safe food covers that can be stacked in a tower-like arrangement for simultaneous placement in a microwave oven. This allows a user of the microwave oven to simultaneously cook multiple food items on one or more different plates, in one or more different bowls, in one or more other food containers, or combinations of these. For example, the tower-like arrangement may include a top food cover that is placed on top of a bottom food cover to form the tower-like arrangement.

In some embodiments, a cavity can be formed by a top wall and a side wall of the respective food covers which allows plates, bowls, and other food containers to be positioned within the cavity. As a result of placing plates, bowls, and other food containers within the respective cavities, food residue from the food items is prevented from coming into contact with interior surfaces of the microwave oven. For example, the one or more food covers can prevent food residue from coming into contact with at least some of a top surface, side surfaces, and bottom surface of the interior of the microwave oven. In a particular example, residue from a food item in a food container positioned near the top of the tower-like arrangement may be prevented from coming into contact with the bottom surface of the interior of the microwave oven by a surface attached to the bottom food cover that supports the particular food item. Similarly, residue form the particular food item may be prevented from coming into contact with the top and side surfaces of the interior of the microwave oven by both the top walls and the one or more side walls of the top food cover and the bottom food cover in the tower-like arrangement.

In some embodiments, food covers (e.g., top food covers and bottom food covers) include channels or groves in a bottom portion of the particular cover that engages a top portion of a bottom food cover. According to these embodiments, the channels or groves may help in securing or otherwise stabilizing a cover that is placed on a bottom cover.

The one or more microwave-safe food covers can also be stacked in a nested arrangement for storage. For example, the bottom food cover can be placed on top of the top food cover so that the top food cover nests within the cavity formed by the top wall and the one or more side walls of the bottom food cover.

In one aspect, a stackable microwave food cover includes a first cover that includes a substantially circular surface having a first diameter, wherein the surface supports one or more first food items to be heated by a microwave oven, a top wall having a second diameter that is less than the first diameter, wherein the substantially circular surface is affixed on the top wall, a substantially circular side wall slanted at an outward angle from beneath an edge of the top wall of the first cover, wherein the top wall of the first cover and the substantially circular side wall of the first cover form a first cavity within which one or more second food items to be heated by the microwave oven are positioned on a bottom surface of an interior of the microwave oven, and wherein a bottom edge of the substantially circular side wall of the first cover forms a substantially circular shape having a third diameter that is less than the first diameter of the substantially circular support and greater than the second diameter of the top wall of the first cover. The stackable microwave cover also includes a second cover including a top wall having a diameter substantially similar to the second diameter of the top wall of the first cover, a substantially circular side wall slanted at an outward angle from beneath an edge of the top wall of the second cover, wherein the top wall of the second cover and the substantially circular side wall of the second cover form a second cavity within which the one or more first food items to be heated by the microwave oven are positioned when the second cover is placed on the substantially circular surface of the first cover, and wherein a bottom edge of the substantially circular side wall of the second cover forms the substantially circular shape having the third diameter, and a substantially circular rim having an interior channel disposed therein, the rim attached to and extending along the bottom edge of the side wall of the second cover, wherein the interior channel engages an edge of the substantially circular surface of the first cover when the second cover is placed on the first cover to cover the one or more first food items, and wherein the second cover nests within the first cavity when the first cover is placed on the second cover.

Embodiments of the subject matter can include one or more of the following features. The first cover and the second cover can be constructed using a polymer material. The substantially circular side wall of the first cover can include one or more venting holes extending through the substantially circular side wall of the first cover. The top wall of the second cover can include one or more venting holes extending through the top wall of the second cover. The one or more first food items and the one or more second food items can be simultaneously heated by the microwave oven the positioning of the first food items and the second food items within the second cover and the first cover, respectively, can prevent food residue from either the first food items or the second food items from coming into contact with side and top surfaces in the interior of the microwave oven and the substantially circular surface can prevent food residue of the one or more first food items from coming into contact with the bottom surface in the interior of the microwave oven when the one or more first items are heated by the microwave oven.

In general, in another aspect, a microwave-safe stackable tower includes a first food cover that includes a top wall for supporting a first food item to be heated by a microwave oven and having a first area, one or more side walls attached to the top wall, the top wall of the first food cover and the one or more side walls of the first food cover forming a first cavity in which a second food item to be heated by the microwave oven is positioned within the first cavity and on a bottom surface in an interior of the microwave oven, wherein a top of the one or more side walls of the first food cover defines a shape having a second area, and wherein a bottom edge of the one or more side walls of the first food cover define a shape having a third area that is greater than the second area and less than the first area. The microwave-safe stackable tower also includes a second food cover that includes a top wall having a fourth area less than either of the first area or the third area, one or more side walls attached to the top wall of the second food cover, the top wall of the second cover and the one or more side walls of the second cover forming a second cavity in which the first food item is positioned when the second cover is placed on the first food cover, wherein a top of the one or more side walls of the second food cover define a shape having the second area, and wherein a bottom edge of the one or more side walls of the second food cover define the shape having the third area so that when the second food cover is placed on the first food cover the one or more side walls of the second food cover are in physical contact with the top wall of the first food cover.

Embodiments of the subject matter can include one or more of the following features. The one or more side walls of the second food cover can include a rim, the rim attached to and extending along the bottom edge of the one or more side walls of the second food cover and having an internal channel disposed therein, the internal channel engaging an edge of the top wall of the first food cover when the one or more sides of the second food cover are placed in physical contact with the top wall of the first food cover. The first cover and the second cover can be constructed using a polymer material. When the first food item and second food item are heated by the microwave oven, food residue from either of the first food item or the second food item can be prevented from coming into contact with side and top surfaces in the interior of the microwave oven, and wherein when the first food item is heated by the microwave oven, food residue from the first food item can be prevent from coming into contact with the bottom surface in the interior of the microwave oven. The second food cover can nest within the first cavity when the first food cover is placed on the second food cover.

In general, in yet another aspect, a first food cover includes a top wall for supporting a first food item and having a particular shape that has a first area, one or more side walls slanted at an outward angle from beneath the top wall, wherein a top of the one or more side walls defines a second area that is smaller than the first area, wherein a bottom edge of the one or more side walls defines a substantially similar shape to the particular shape of the top wall and has a third area greater than the second area and less than the first area, and wherein the top wall and the one or more side walls form a first cavity for positioning a second food item.

Embodiments of the subject matter can include one or more of the following features. The one or more side walls can further include one or more venting holes extending through the one or more side walls. The first food cover can be constructed using a polymer material. The top wall of the first food cover can be covered by a second food cover including a top wall having a substantially similar shape to the particular shape of the top wall of the first food cover and having the second area, one or more side walls slanted at an outward angle from beneath an edge of the top wall of the second food cover, wherein the top wall of the second cover and the one or more side walls of the second form a second cavity, and wherein a bottom edge of the one or more side walls of the second food cover defines substantially similar shape to the particular shape of the top wall of the first food cover and having the third area. The top wall of the second food cover can further include venting holes extending through the top wall of the second cover. The one or more side walls of the second food cover can include a rim, wherein the rim attaches to and extends along the bottom edge of the one or more side walls of the second food cover, wherein the rim includes an internal channel disposed therein, and wherein the internal channel engages the edge of the top wall of the first cover when the one or more sides of the second cover are placed in physical contact with the top wall of the first cover. The second cover can be constructed using a polymer material. The second food cover can nest within the first cavity when the first food cover is placed on the second food cover. The first food item can be positioned within the second cavity when the second food cover is placed on the first food cover within the second cavity when the second food cover is placed on the first food cover. When the first food item and the second food item are heated by the microwave oven, food residue from either of the first food item or the second food item is prevented from coming into contact with side and top surfaces in an interior of the microwave oven, and wherein when the first food item is heated by the microwave oven, residue from the first food item is prevent from coming into contact with a bottom surface in the interior of the microwave oven.

Embodiments of the disclosed subject matter can realize none, one or more of the following advantages. Multiple food items can be covered and cooked simultaneously while residue from the food items is prevented from spraying or otherwise landing on interior surfaces of the microwave oven. By enabling a user of the microwave oven to cook additional food items at the same time, and without causing a mess, food preparation times can be reduced. Also, one or more food covers can be positioned in different arrangements to achieve different purposes. For example, the one or more food covers can be arranged for cooking or for storage.

The details of one or more embodiments of the subject matter are set forth in the accompanying drawings and the description below. Other features, objects, and advantages of the subject matter will be apparent from the description and drawings, and from the claims.

DESCRIPTION OF DRAWINGS

Like reference symbols in the various drawings indicate like elements.

DETAILED DESCRIPTION

Figure 1:
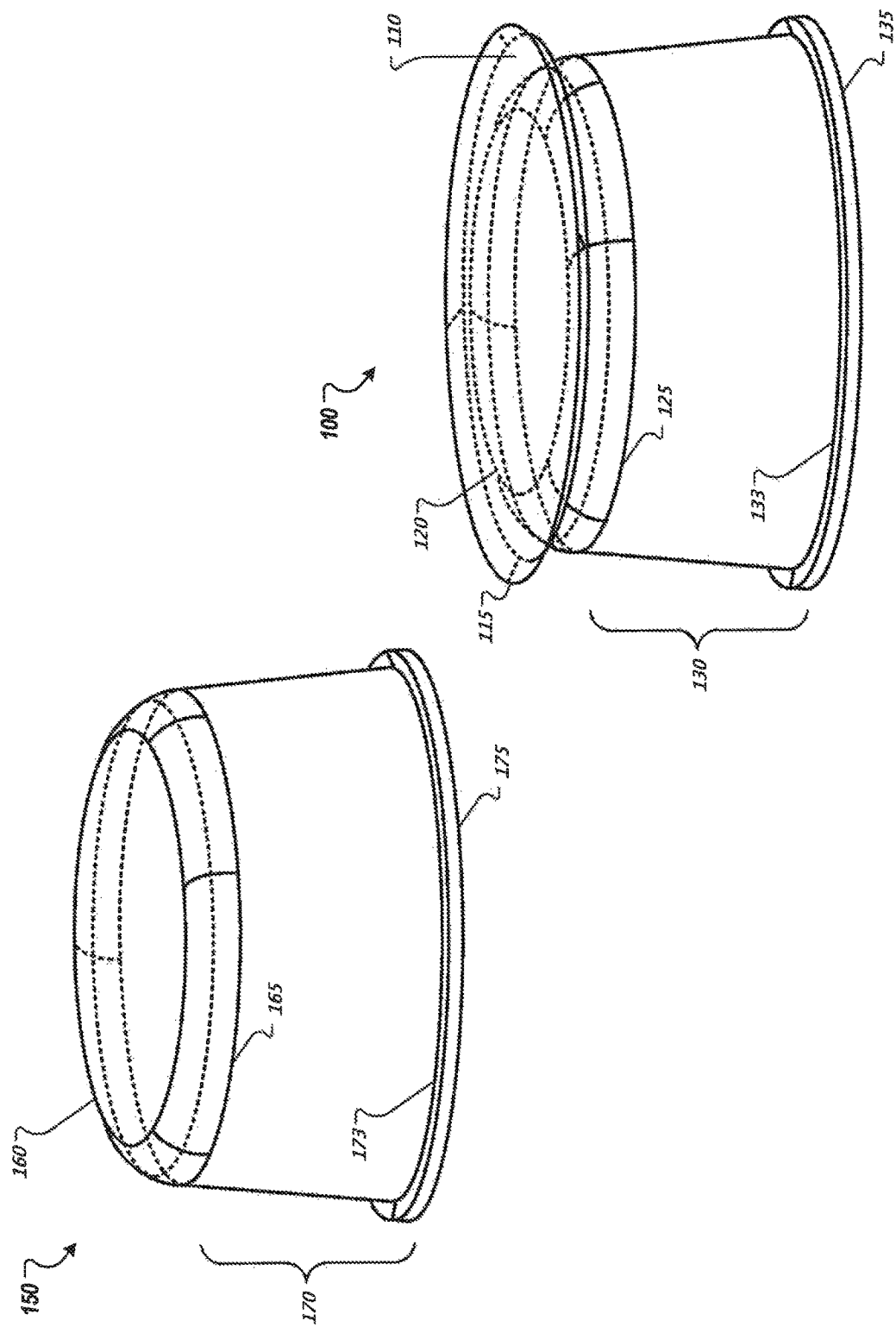
FIG. 1 shows a side view of a first food cover and a second food cover according to a particular embodiment.

In general, the subject matter disclosed herein describes one or more microwave-safe food covers that can be stacked in a tower-like arrangement for simultaneous placement in a microwave oven. This allows a user of the microwave oven to simultaneously cook multiple food items on one or more different plates, in one or more different bowls, in one or more other food containers, or combinations of these. For example, the tower-like arrangement may include a top food cover that is placed on top of a bottom food cover to form the tower-like arrangement. Used herein, the term "bottom cover" is used to describe a cover that is designed to support another cover, e.g., by placing a top cover on the bottom cover, and is not intended to be limited to particular positions within the tower-like arrangement. For example, the top food cover can be placed on a first bottom food cover and the first bottom cover can be placed on a second bottom cover to form the tower-like arrangement. Because the manner in which microwave ovens cook food (e.g., by generating beams of high energy that can excite food particles causing them to rise in temperature) can cause food residue to spray or splatter on the interior surfaces of the microwave oven, the tower-like arrangement can act as a shield to prevent food residue from coming into contact with the interior surfaces of the microwave oven.

In some embodiments, a cavity can be formed by a top wall and a side wall of the respective food covers which allows plates, bowls, and other food containers to be positioned within the cavity. As a result of placing plates, bowls, and other food containers within the respective cavities, food residue from the food items is prevented from coming into contact with interior surfaces of the microwave oven. For example, the one or more food covers can prevent food residue from coming into contact with at least some of a top surface, one or more side surfaces, and a bottom surface of an interior of the microwave oven. In a particular example, residue from a food item in a food container positioned near the top of the tower-like arrangement may be prevented from coming into contact with the bottom surface of the interior of the microwave oven by a surface attached to the bottom food cover that supports the particular food item. Similarly, residue form the particular food item may be prevented from coming into contact with the top and side surfaces of the interior of the microwave oven by both the top walls and the one or more side walls of the top food cover and the bottom food cover in the tower-like arrangement.

In some embodiments, one or more of the food covers (e.g., top food covers and bottom food covers) include channels or groves in a bottom portion of the particular cover that engages a top portion of a bottom food cover. According to these embodiments, the channels or groves may help to secure or otherwise stabilize a food cover that is placed on a bottom cover. For example, the channels or groves can engage a top portion of a bottom cover to secure or otherwise stabilize a food cover that is placed on a bottom food cover by preventing the food cover that is placed on the bottom food cover from sliding off of the bottom food cover on which the top cover is placed.

In addition, in some embodiments, one or more of the food covers may include venting holes that allow steam to escape from the food covers. This may allow the temperature of the food being cooked to be better regulated and/or to prevent users of the food covers from being subjected to steam burns or other steam-related injuries that may arise when food is covered while being cooked using a microwave oven. For example, the top food cover may include venting holes that extend through the top of the top food cover while the bottom food cover may include venting holes that extend through the walls of the bottom cover (e.g., because covers placed on the bottom cover may seal or otherwise prevent steam from escaping through the top of the bottom cover).

The one or more microwave-safe food covers can also be stacked in a nested arrangement for storage. For example, the bottom food cover can be placed on top of the top food cover so that the top food cover nests within the cavity formed by the top wall and the one or more side walls of the bottom food cover. In other words, different arrangements of the top food cover and bottom food cover are suitable for different purposes.

Figure 2:
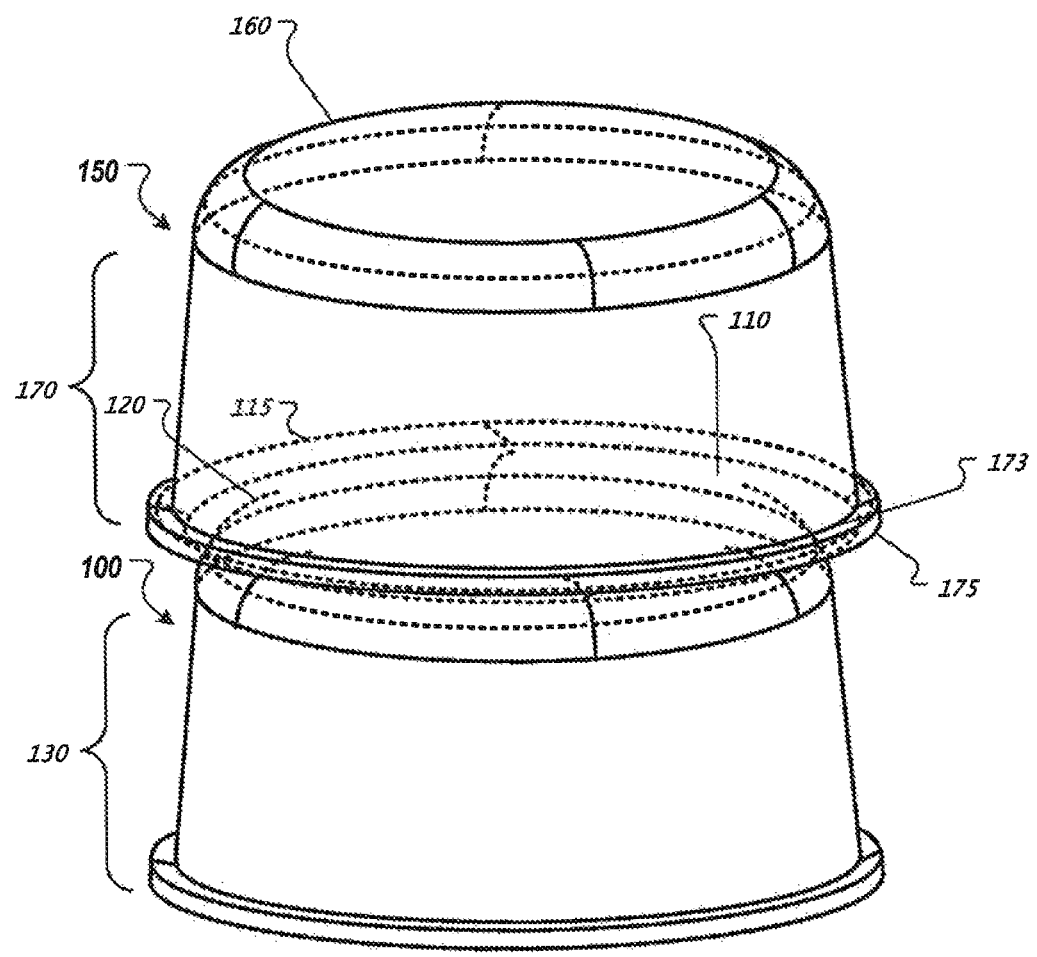
FIG. 2 shows a side view of the first food cover and a second food cover in a stacked arrangement for cooking according to a particular embodiment.
Figure 3:
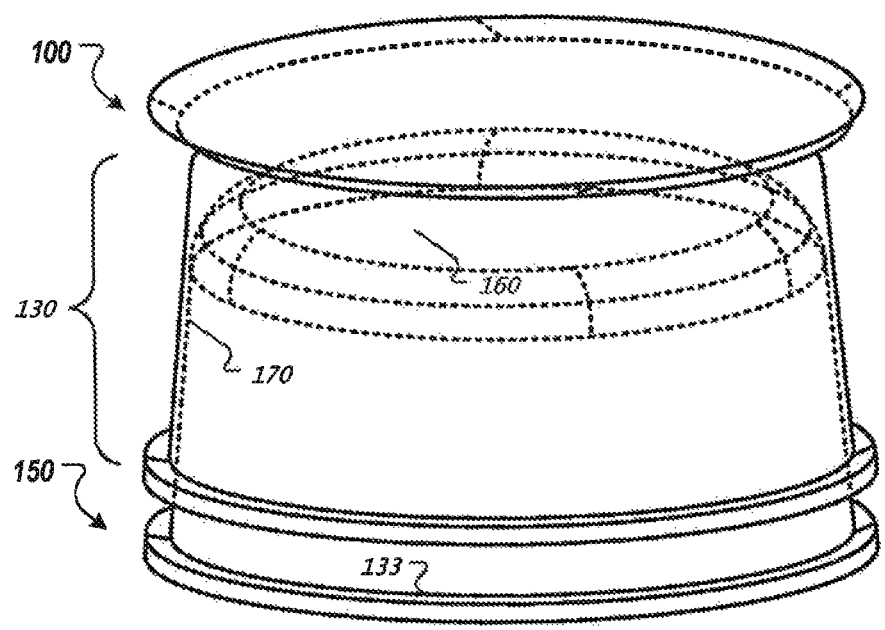
FIG. 3 shows a side view of the first food cover and the second food cover in a stacked arrangement for storage according to a particular embodiment.

FIGS. 1-3 are now described in relation to multiple substantially circular food covers. But as will be described in more detail below, the food covers may be manufactured in various shapes while still retaining the same general characteristics of the illustrated food covers. For example, the food covers can be stacked in different arrangements for different purposes regardless of their particular shape, so long as each food cover included in the multiple food covers shares a similar shape and a similar dimension with other food covers.

Referring now to FIG. 1, a side view of a first food cover 100 and a second food cover 150 according to a particular embodiment is shown. In general, the first food cover 100 and the second food cover 150 are designed to cover one or more items of food. For example, the first food cover 100 can cover one or more food items without the addition of the second food cover 150 being positioned on top of the first food cover 100. Likewise, the second food cover 150 can cover one or more food items even when the second food cover 150 is not placed on the first food cover 100. When the first food cover 100 and the second food cover 150 are arranged in a tower-like arrangement, however, the presence of the first food cover 100 and the second food cover 150 allow a user of the microwave oven to cook multiple food items simultaneously while still preventing food residue from coming into contact with the interior surfaces of the microwave oven. In general, the first food cover 100 can be considered a bottom food cover in a tower-like arrangement in that the first food cover 100 is designed to support the second food cover 150 when the second food cover is placed on the first food cover 100.

In general, the food covers 100 and 150 are made of microwave-safe materials. For example, both food covers 100 and 150 can be manufactured of materials (e.g., plastics, polymer, or other microwave safe materials) that are suitable to be placed within a microwave oven when the microwave oven is cooking food.

In general, the first food cover 100 includes a substantially circular surface 110, a top wall 120, and a substantially circular side wall 130. The top wall 120 and the substantially circular side wall 130 can form a cavity so that food items can be placed in the cavity by a user of the microwave oven. As the microwave oven cooks the one or more food items, the walls of the cavity (e.g., the top wall 120 and the substantially circular side wall 130) can prevent food residue originating from the food items from coming into contact the inside of the microwave oven. The cavity will be described in more detail below in reference to FIGS. 4A-4D.

In general, the substantially circular surface 110 is suitable for supporting one or more food items that are placed in or on one or more plates, bowls, or other food containers. In some instances, the user of the microwave over may opt to place the one or more food items directly on the substantially circular surface 110 without first placing the one or more food items on or in one or more plates, bowls, or other containers. For example, a user of the microwave oven may opt to place a package of frozen produce or other food item directly on the substantially circular surface 110.

The substantially circular surface 110 may also be attached on top of the top wall 120. For example, the substantially circular surface 110 may be affixed with plastic screws or other similar microwave-safe fasteners, or the substantially circular surface 110 and the top wall 120 may be formed together when the first food cover 100 is manufactured.

The substantially circular surface 110 also includes an edge 115. In general, the edge 115 of the substantially circular surface 110 may extend beyond at least the top wall of the first cover 100. In some embodiments, the edge 115 of the substantially circular surface 110 may extend beyond a bottom edge of the first cover 100 (e.g., beyond a bottom edge of a wall of the first cover 100). In some embodiments, the edge 115 may be raised. For example, the substantially circular surface 115 may be akin to a plate or other surface that generally provides a relatively flat surface area and that also includes a raised edge. That is, the edge 115 may not be in the same plane as the substantially circular surface 110. In other embodiments, the edge 115 is in the same plane as the substantially circular surface 110. For example, the substantially circular surface 110 and edge 115 may a form a substantially flat surface.

Like the substantially circular surface 110, the top wall 120 may also be substantially circular. The top wall 120, however, may have a diameter that is smaller than the substantially circular surface 110 (and therefore may have an area that is less than the substantially circular surface 110). In addition, the top wall 120 includes an edge 125 from which the substantially circular side wall 130 extends. For example, the substantially circular side wall may extend outwardly from the edge 125 to form a sloping side wall 130 that is angled away from the top wall 120 (e.g., similar to the shape of a cone). As a result, the diameter at the top of the substantially circular side wall 130 is smaller than the diameter at the bottom of the substantially circular side wall 130. The angle of the substantially circular side wall 130 may vary depending on various embodiments. For example, the angle may be relatively small so that the substantially circular side 130 slopes gently away from the top wall 120 (e.g., so that the first food cover 100 looks more cylindrical than cone-shaped). As another example, the angle may be relatively large so that the substantially circular side 130 slopes more aggressively away from the top wall 120 (e.g., so that the first food cover 100 looks more cone-shaped than cylindrical).

Because the substantially circular side wall 130 extends from beneath the edge 125 of the top wall 120 at an outward angle, a bottom edge 133 of the substantially circular side wall 130 forms a substantially circular shape having a third diameter that is less than the first diameter of the substantially circular surface 110 and greater than the second diameter of the top wall 120. In some embodiments, a lip or rim 135 may be attached to the bottom edge 133 of the substantially circular side wall 130. Also, in some embodiments, the inside of the lip or rim 135 may include a channel or grove that can be used to secure the first food cover 100 when the first food cover 100 is placed on other first food covers 100. An example of a channel or groove is shown in reference to FIGS. 4A-4D.

In general, the second food cover 150 includes a top wall 160 and a substantially circular side wall 170. The top wall 160 and the substantially circular side wall 170 can form a cavity so that food items can be placed in the cavity by a user of the microwave oven. As the microwave oven cooks the one or more food items, the walls of the cavity (e.g., the top wall 160 and the substantially circular side wall 170) can prevent food residue originating from the food items from coming into contact the inside of the microwave oven. As described above, the cavity will be described in more detail below in reference to FIGS. 4A-4D.

The top wall 160 may be substantially circular. In addition, the top wall 160 includes an edge 165 from which the substantially circular side wall 170 extends. For example, the substantially circular side wall 170 may extend outwardly from the edge 165 to form a sloping side wall 170 that is angled away from the top wall 160 (e.g., similar to the shape of a cone). As a result, the diameter at the top of the substantially circular side wall 170 is smaller than the diameter at the bottom of the substantially circular side wall 170. The angle of the substantially circular side wall 170 may vary depending on various embodiments. For example, the angle may be relatively small so that the substantially circular side 170 slopes gently away from the top wall 160 (e.g., so that the second food cover 150 looks more cylindrical than cone-shaped). As another example, the angle may be relatively large so that the substantially circular side 170 slopes more aggressively away from the top wall 160 (e.g., so that the second food cover 150 looks more cone-shaped than cylindrical).

Because the substantially circular side wall 160 extends from beneath the edge 165 of the top wall 170 at an outward angle, a bottom edge 173 of the substantially circular side wall 170 forms a substantially circular shape having a third diameter that is less than the first diameter of the substantially circular surface 110 of the first food cover 100 and greater than the second diameter of the top wall 160 of the second food cover 150. In some embodiments, a lip or rim 175 may be attached to the bottom edge 173 of the substantially circular side wall 170. Also, in some embodiments, the inside of the lip or rim 175 may include a channel or grove that can be used to secure the second food cover 150 when the second food cover is placed on the first food cover 100. An example of a channel or groove is shown in reference to FIGS. 4A-4D.

In some embodiments, the first food cover 100 and the second food cover 150 differ based on the inclusion of the substantially circular surface 110. This allows, for example, two of the second food covers 150 to be manufactured and then one of the food covers 150 to be modified to form food cover 100. For example, in some embodiments, the second food cover 150 can be modified by adding the substantially circular support 110 to the top wall 160 of the second food cover 150 to yield a first food cover 100.

Figure 4A:
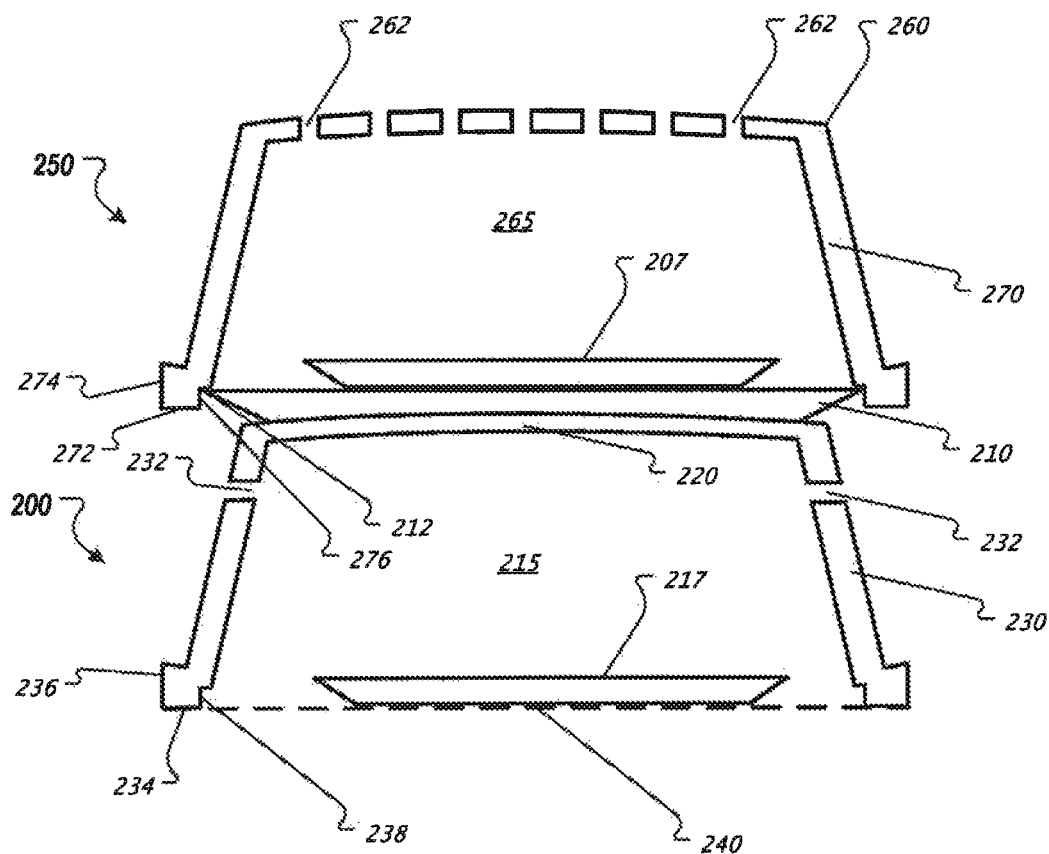
FIG. 4A shows a cross-sectional view of the first food cover and the second food cover in a stacked arrangement for cooking according to a particular embodiment.
Figure 4B:
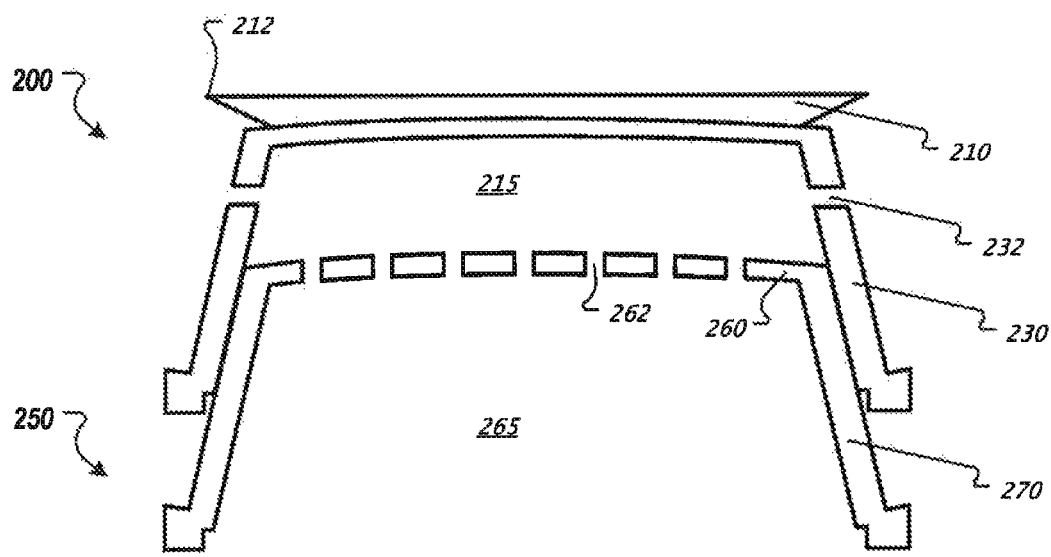
FIG. 4B shows a cross-sectional view of the first food cover and the second food cover in a stacked arrangement for storage according to the particular embodiment shown in FIG. 4A.
Figure 4C:
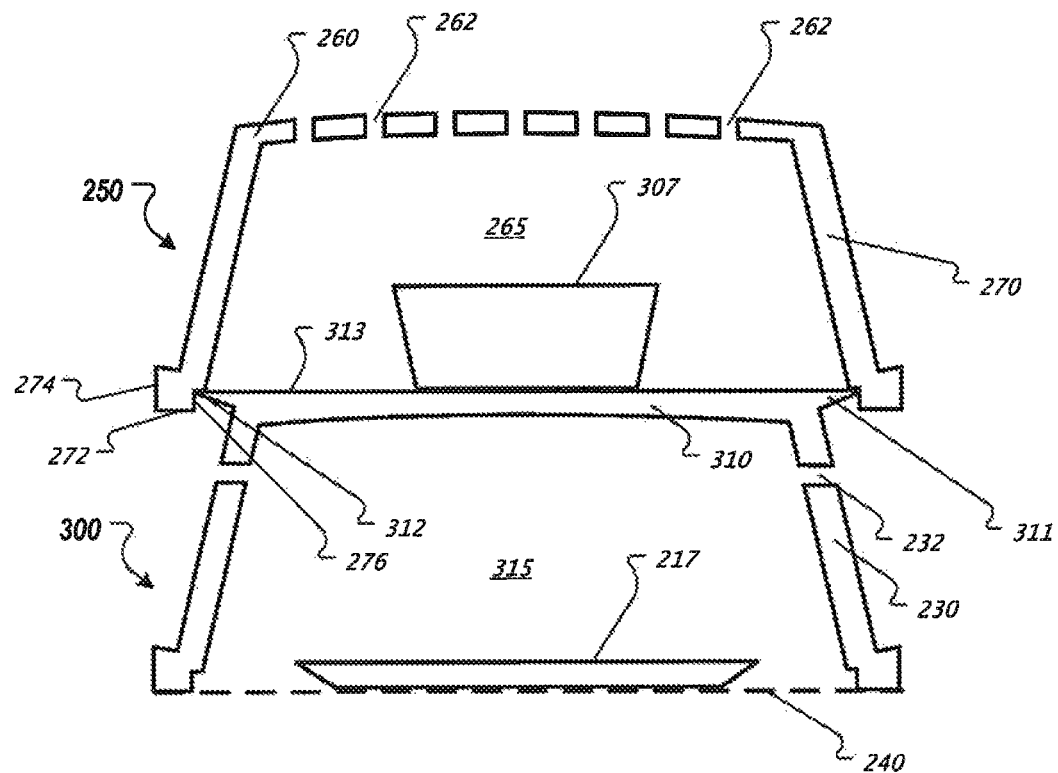
FIG. 4C shows a cross-sectional view of the first food cover and the second food cover in a stacked arrangement for cooking according to a particular embodiment.
Figure 4D:
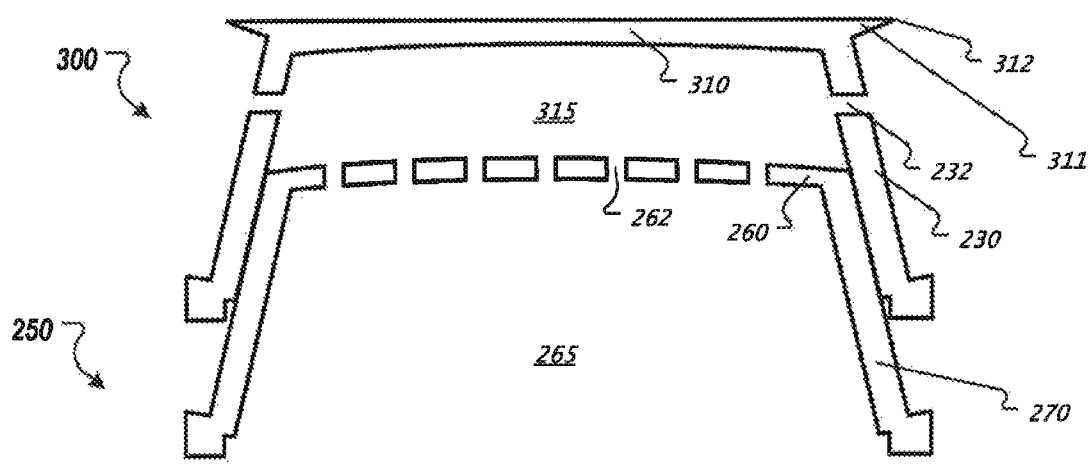
FIG. 4D shows a cross-sectional view of the first food cover and the second food cover in a stacked arrangement for storage according to the particular embodiment shown in FIG. 4C.

In other embodiments, and as is illustrated with respect to FIGS. 4C and 4D, the first food cover 100 and the second food cover 150 may be manufactured to be slightly different. For example, as will be described in more detail below with respect to FIGS. 4C and 4D, the top wall 120 of the first food cover 100 may be the substantially circular support 110 and may not have any additional surfaces, supports, or other structures that are affixed on top of the top wall 120. In other words, the top wall 120 may be replaced with the substantially circular support 110.

Referring now to FIG. 2, a side view of the first food cover 100 and a second food cover 150 in a stacked arrangement for cooking according to a particular embodiment is shown. In general, the second food cover 150 can be placed on the first food cover 100. For example, the bottom edge 173 of the second food cover 150 can be placed in physical contact with the substantially circular surface 110 of the first food cover 100. In a particular example, the rim 175 of the second cover 150 can engage or can otherwise be placed in contact with the rim 115 of substantially circular surface 110.

As described elsewhere in this specification, the rim 175 may include a channel or groove that engages the rim 115 of the substantially circular support. As a result, the second food cover 150 is essentially prevented from sliding off a side of the substantially circular surface 110. If, for example, the user of the microwave oven wishes to remove the second food cover 150, the user can lift the second food cover 150 from the first food cover 100.

In general, this arrangement can be accomplished because, as described elsewhere in this specification, the edge 115 of the substantially circular surface 110 extends beyond the bottom of the either of the first food cover 100 or the second food cover 150. That is, the substantially circular surface 110 provides a surface on which the second food cover 150 can sit. Based on this multi-tier arrangement, the stackable arrangement allows foods items to be placed within two separate cavities: a first cavity formed by the top wall 120 and the substantially circular side wall 160 of the first food cover 100 and a second cavity formed by the top wall 160 and the substantially circular side wall 170 of the second food cover 150. By being placed within these cavities, the food items can be cooked while the microwave oven is protected from food residue that may be generated as a result of cooking the food in the microwave oven.

Referring now to FIG. 3, a side view of the first food cover 100 and the second food cover 150 in a stacked arrangement for storage according to a particular embodiment is shown. In general, the first food cover 100 can be placed on top of the second food cover 150. As a result, the second food cover 150 can nest within the cavity formed by the top wall 120 (not shown in FIG. 3 for the purposes of providing a clearer view of the second food cover 150) and the substantially circular side wall 130.

For example, because the top wall 120 of the first food cover 100 has a smaller diameter than substantially circular shape formed by the bottom edge 133 of the substantially circular side wall 130, the cavity formed by the top wall 120 and the substantially circular side wall 130 is larger at the bottom than at the top. As a result, the second food cover 150 may be partially inserted into the cavity until either of the top wall 160 or the substantially circular side wall 170 of the second food cover comes into contact with an interior surface of the cavity formed by the top wall 120 and the substantially circular side wall 130. As a result of coming into contact with the interior surface of the cavity, a resistance force is exerted on the second food cover 150, preventing the second food cover 150 from being further inserted into the cavity.

Because most of the second food cover 150, however, can be inserted into the cavity formed by the top wall 120 and the substantially circular side wall 130, this nested arrangement reduces the overall height of the first food cover 100 and the second food cover relative to the tower-like arrangement shown in FIG. 2. The reduction in height of the first food cover 100 and the second food cover 150 stacked in this manner allows the first food cover 100 and the second food cover 150 to be arranged for storage.

While the above discussion with respect to FIGS. 1-3 illustrates a substantially circular first food cover 100 and a substantially circular second food cover 150, the food covers 100 and 150 may be manufactured in various shapes, including square, oval, rectangular, triangular, and so forth. In such embodiments, one or more aspects of the first food cover 100 and the second food cover 150 may change to conform to the selected shape. For example, the substantially circular surface 110 may instead be a substantially rectangular surface, a substantially triangular surface, a substantially square surface, and so forth, according to particular embodiments. Likewise, the top walls 120 and 160 may instead be substantially square, substantially rectangular, substantially, triangular, and sort forth, according to particular embodiments.

If, for example, the substantially circular surface 110 is replaced with a substantially triangular surface, the substantially circular side wall 130 may be replaced with three sides that form a substantially triangular wall. Likewise if, for example, the substantially circular surface 110 is replaced with a substantially rectangular surface, the substantially circular side wall 130 may be replaced four sides that form a substantial rectangular wall. Similar modifications to the top wall 160 and the substantially circular side wall 170 for the second food cover 150 are also possible.

In this regard, FIGS. 4A-4B show a cross-sectional view of a first food cover 200 and a second food cover 250 without regard to a particular shape. That is, the cross-sectional view of the first food cover 200 and the second food cover 250 illustrate various features and arrangements of the food covers 200 and 250 regardless of whether the first food cover 200 and the second food cover 250 are substantially square, oval, rectangular, triangular, or any other shape, such as the substantially circular covers described above in reference to FIGS. 1-3.

Referring now to FIG. 4A, a cross-sectional view of the first food cover 200 and the second food cover 250 in a stacked arrangement for cooking according to a particular embodiment is shown.

The first food cover 200 includes a surface 210 that can support one or more first food items (e.g., food items placed on a plate 207). In general, the surface 210 can define a first area based on the shape of the surface 210. For example, if the surface 210 is rectangular in shape, the first area is defined by an equation $A=X*Y$, where X is a long edge of the surface 210 and Y is a short edge of the surface 210. Similarly, if the surface 210 is circular, the first area is defined by an equation $A=\pi*R^2$, where R is the radius of the surface 210. Other first areas can also be defined using various equations based on the shape of the surface 210.

The surface 210 also includes an edge 212. In the depicted example, the edge 212 is on the same plane as the surface 210. Other embodiments, however, may include an edge 212 that is above the plane of the surface 210. Also, in depicted example, the edge 212 extends beyond an edge of a top wall 220 of the first food cover 200.

In general, the top wall 220 of the first food cover 200 has a second area. For example, if the top wall 220 is rectangular in shape, the second area is defined by an equation $A=X*Y$, where X is a long edge of the top wall 220 and Y is a short edge of the top wall 220. Similarly, if the top wall 220 is circular, the second area is defined by an equation $A=\pi*R^2$, where R is the radius of the top wall 220. Other second areas can also be defined using various equations based on the shape of the top wall 220.

The first food cover 200 also includes one or more side walls 230. For example, if the top wall 220 is substantially circular the one or more side walls 230 may be a substantially circular side wall. As another example, if the top wall 220 is substantially triangular, the one or more side walls 230 may be three side walls that conform to a shape of a triangle.

The top wall 220 and the side walls 230 can form a cavity, such as cavity 215 in which one or more second food items can be placed (e.g., food items placed on a plate 217). In some embodiments, the side walls 230 may include one or more venting holes 232 that extend through the side walls 230. For example, the side walls 230 can be drilled or otherwise penetrated to form the venting holes 232. The venting holes 232 can extend entirely through the side walls 230 such that steam or other gases generated as part of cooking the food using the microwave oven can escape from the cavity 215. In addition, the venting holes are small enough that food residue is substantially prevented from escaping the cavity 215 during cooking of the food items.

The side walls 230 of the first food cover 200 also include a bottom edge 234 that can be positioned on a bottom interior surface of the microwave oven (e.g., illustrated as the dashed line 240). In some implementations, the bottom edge 234 may also include a rim 236 that is attached to the bottom edge 234. In some embodiments, the rim 236 includes a groove or channel 238 that is cut into rim 236. The groove or channel 238 may allow the first food cover 200 to be placed and secured on other first food covers 200 in a similar fashion to the way in which the second food cover 250 can be placed and secured on the first food cover 200 (e.g., as is described in more detail elsewhere in this specification).

The second food cover 250 includes a top wall 260 that has the second area. For example, if the top wall 260 is rectangular in shape, the first area is defined by an equation A=X*Y, where X is a long edge of the top wall 260 and Y is a short edge of the top wall 260. Similarly, if the top wall 260 is circular, the first area is defined by an equation A=π*R², where R is the radius of the top wall 260. Other areas can also be defined using various equations based on the shape of the top wall 260.

The second food cover 250 also includes one or more side walls 270. For example, if the top wall 260 is substantially circular the one or more side walls 270 may be a substantially circular side wall. As another example, if the top wall 260 is substantially triangular, the one or more side walls 270 may be three side walls that conform to a shape of a triangle.

The top wall 260 and the side walls 270 can form a cavity, such as cavity 265 in which one or more first food items can be placed (e.g., the food items placed on the plate 207 that is supported by the surface 210). In some embodiments, the top wall 260 includes one or more venting holes 262 that extend through the top wall 260. For example, the top wall 260 can be drilled or otherwise penetrated to form the venting holes 262. The venting holes 262 can extend entirely through the top wall 260 such that steam or other gases generated as part of cooking the food using the microwave oven can escape from the cavity 265. In addition, the venting holes are small enough that food residue is substantially prevented from escaping the cavity 265 during cooking of the food items.

The side walls 270 of the second food cover 250 also include a bottom edge 272 that can be positioned on the surface 210 of the first food cover 200. In some implementations, the bottom edge 272 may also include a rim 274 that is attached to the bottom edge 272. In some embodiments, the rim 274 includes a groove or channel 276 that is cut into rim 274. The groove or channel 276 may allow the second food cover 250 to be placed and secured on the first food cover 200. For example, the groove or channel 272 can engage the edge 212 of the surface 210 of the first food cover 200.

In some embodiments, the engagement of the groove or channel 276 with the edge 212 provides a securing mechanism for the second food cover 250 when placed on the first food cover 200. For example, in microwave ovens that include an internal turn-table or other mechanisms for rotating food (e.g., to improve the evenness of the cooking), the channel or grove 276 may prevent the rotational motion from inadvertently disturbing the placement of the second food cover 250 with respect to the first food cover 200. For example, the channel or groove 276 can prevent the second food cover 250 from sliding off of the surface 210. In such embodiments, the second food cover 250 may still be removed from the first food cover 200 by lifting the second food cover 250 in a substantially upward direction.

Referring now to FIG. 4B, a cross-sectional view of the first food cover 200 and the second food 250 cover in a stacked arrangement for storage according to the particular embodiment shown in FIG. 4A is shown. In the depicted example, the second food cover 250 may be substantially inserted into the cavity 215 to nest the second food cover 250 within the first food cover 200. Also, as shown in the depicted example, the exterior surfaces of the one or more side walls 270 come into contact with the interior surfaces of the one or more side walls 230. In general, it is the physical presence of the interior surfaces of the one or more side walls 230 that prevents the second food cover 250 from being inserted fully into the cavity 215. The arrangement show in reference to FIG. 4B, however, allows the first food cover 200 and the second food cover to be arranged in a manner that is more conducive for storing the food covers 200 and 250. For example, the height of the nesting arrangement in FIG. 4B is substantially less than the height of the tower arrangement in FIG. 4A.

Referring now to FIGS. 4C-4D, a cross-sectional view of another embodiment of a first food cover 300 and the second food cover 250 are presented without regard to a particular shape. That is, that cross-sectional view of the first food cover 300 and the second food cover 250 illustrate various features and arrangements of the food covers 300 and 250 regardless of whether the first food cover 300 and the second food cover 250 are substantially square, oval, rectangular, triangular, or any other shape. In general, the first food cover 300 is similar to the first food covers 150 and 250. For example, the first food cover 300 includes one or more side walls 230 that include one or more venting holes 232. Likewise, second food cover 350 includes a top wall 260 that includes one or more venting holes 262. As another example, a top wall 310 and the one or more side walls side walls 230 of the first food cover 300 may form a cavity 315 that is of substantially similar dimensions to the cavity 215 of the second food cover 200. But the food cover 300 may also be different in certain respects.

Referring now to FIG. 4C, a cross-sectional side view of the first food cover 300 and the second food cover 250 in a stacked arrangement for cooking according to a particular embodiment is shown. The first food cover 300 includes the top wall 310. In the depicted example, the top wall 300 also serves as a surface in which food items can be supported (e.g., such as food items placed in a bowl 307). For example, the top wall 310 may include a flange 311 or other structure that extends beyond a top of the one or more side walls 230 of the first food cover 300. In some embodiments, the flange 311 may extend away from the side walls 230 at an upward angle. For example, a top surface 313 of the top wall 310 and the flange 311 may form a concave surface (e.g., the edge 312 may be in a different plane than the top wall 310). As another example, the top surface 313 of the top wall 310 and the flange 311 may form a substantially flat surface (e.g., the edge 312 may be a same plane as the top wall 310).

In general, and similar to edge 212, the edge 312 can interact with the channel or groove 276 of the second food cover 250 to secure the second food cover 250 on the first food cover 350. For example, the edge 312 can prevent the second food cover 250 from sliding off of the first food cover 300. The second food cover 250 can be removed from the first food cover 300, however, by lifting the second food cover 250 in a generally upward direction.

Referring now to FIG. 4D, a cross-sectional view of the first food cover and the second food cover in a stacked arrangement for storage according to the particular embodiment shown in FIG. 4C is shown. In the depicted example, the second food cover 250 may be substantially inserted into the cavity 315 to nest the second food cover 250 within the first food cover 300. Also, as shown in the depicted example, the exterior surfaces of the one or more side walls 270 come into contact with the interior surfaces of the one or more side walls 230. In general, it is the physical presence of the interior surfaces of the one or more side walls 230 that prevents the second food cover 250 from being inserted fully into the cavity 315. The arrangement show in reference to FIG. 4D, however, allows the first food cover 300 and the second food cover 250 to be arranged in a manner that is more conducive for storing the food covers 300 and 250. For example, the height of the nesting arrangement in FIG. 4D is substantially less than the height of the tower arrangement in FIG. 4C.

Figure 5:
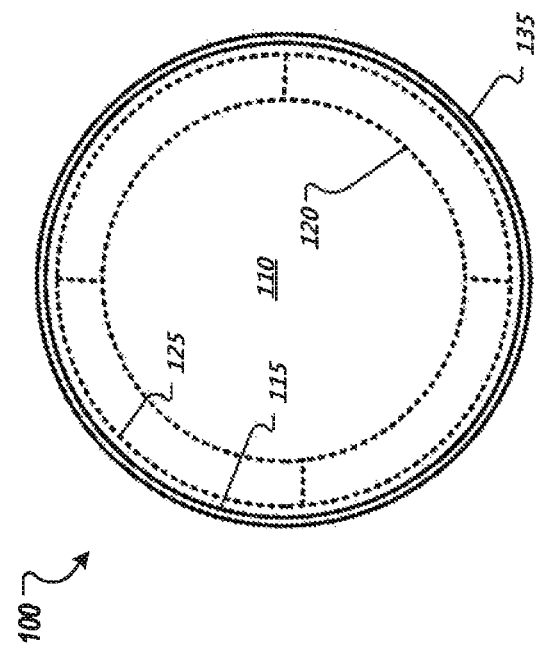
FIG. 5 shows a top-down view of the first food cover and the second food cover according to a particular embodiment.
Figure 5:
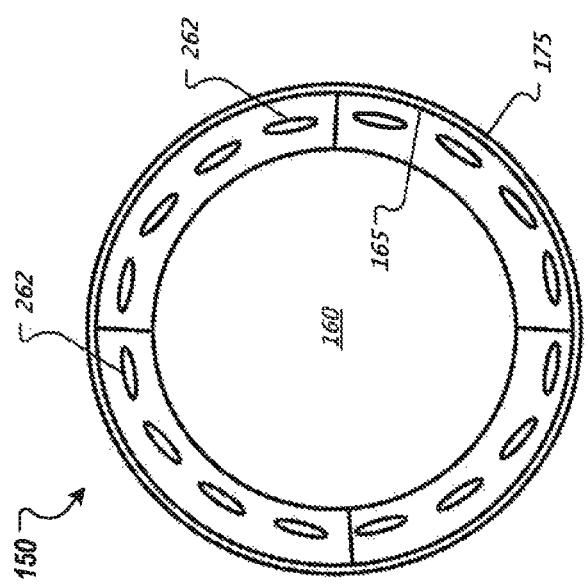

Referring now to FIG. 5, a top-down view of the first food cover 100 and the second food cover 150 according to a particular embodiment is shown. With respect to the first food cover 100, approximate relationships are illustrated between the rim 135, the edge 115 of the substantially circular surface 110, and the edge 125 of the top wall 120 of the first food cover 100. For example, in some embodiments, the edge 115 may extend beyond the edge 125 of the top wall 120, but not beyond the rim 135 of the first food cover. In other embodiments, the edge 115 may extend beyond both the edge 125 of the top wall 120 and the rim 135.

With respect to the second food cover 150, approximate relationships are illustrated between the rim 175 and the edge 165 of the top wall 160. For example, the edge of the top wall 165 does not extend beyond the rim 175. Venting holes 262 are also shown that are cut or drilled into the top wall 160. In the depicted example, the venting holes 262 are shown as oval in shape, although any shape is possible so long as the venting holes are not so large that food residue is allowed to escape the second food cover 150. As a result, narrow slits or ovals may be more suitable shapes for venting holes than triangles and circles, although no particular shape is generally precluded from being used to form the venting holes 262.

A number of embodiments of the invention have been described. Nevertheless, it will be understood that various modifications may be made without departing from the spirit and scope of the invention. Accordingly, other embodiments are within the scope of the following claims.

What is claimed is:

1. A microwave-safe stackable tower comprising:
   a first food cover comprising:
      a top wall for supporting a first food item to be heated by a microwave oven and having a first area, wherein the top wall comprises a flange;
      one or more side walls integrally attached to the top wall to form a unitary body, the top wall of the first food cover and the one or more side walls of the first food cover forming a first cavity in which a second food item to be heated by the microwave oven is positioned within the first cavity and on a bottom surface in an interior of the microwave oven,
      wherein a top of the one or more side walls of the first food cover defines a shape having a second area,
      wherein a bottom edge of the one or more side walls of the first food cover defines a shape having a third area that is greater than the second area and less than the first area, and
      wherein the flange of the top wall extends laterally beyond an edge of the top of the one or more side walls of the first food cover; and
   a second food cover comprising:
      a top wall having a fourth area less than either of the first area or the third area;
      one or more side walls attached to the top wall of the second food cover, the top wall of the second cover and the one or more side walls of the second cover forming a second cavity in which the first food item is positioned when the second cover is placed on the first food cover,
      wherein a top of the one or more side walls of the second food cover define a shape having the second area, and
      wherein a bottom edge of the one or more side walls of the second food cover define the shape having the third area so that when the second food cover is placed on the first food cover the one or more side walls of the second food cover are in physical contact with the top wall of the first food cover.

2. The microwave-safe stackable tower of claim 1, wherein the one or more side walls of the second food cover include a rim, the rim attached to and extending along the bottom edge of the one or more side walls of the second food cover and having an internal channel disposed therein, the internal channel engaging an edge of the top wall of the first food cover when the one or more sides of the second food cover are placed in physical contact with the top wall of the first food cover.

3. The microwave-safe stackable tower of claim 1, wherein the first cover and the second cover are constructed using a polymer material.

4. The microwave-safe stackable tower of claim 1, wherein when the first food item and second food item are heated by the microwave oven, food residue from either of the first food item or the second food item is prevented from coming into contact with side and top surfaces in the interior of the microwave oven, and
   wherein when the first food item is heated by the microwave oven, food residue from the first food item is prevent from coming into contact with the bottom surface in the interior of the microwave oven.

5. The microwave-safe stackable tower of claim 1, wherein the second food cover nests within the first cavity when the first food cover is placed on the second food cover, wherein the one or more side walls of the first food cover includes one or more venting holes extending through the one or more side walls, and wherein the one or more venting holes remain exposed when the first food cover is placed on the second food cover and the second food cover nests within the first cavity.

6. A first food cover comprising:

a top wall for supporting a first food item and having a particular shape that has a first area, wherein the top wall comprises a flange;

one or more side walls slanted at an outward angle extending from beneath the top wall, wherein a top of the one or more side walls defines a shape having a second area that is smaller than the first area, wherein a bottom edge of the one or more side walls defines a substantially similar shape to the particular shape of the top wall and has a third area greater than the second area and less than the first area, wherein the flange of the top wall extends laterally beyond an edge of the top of the one or more side walls; and wherein the top wall and the one or more side walls form a first cavity for positioning a second food item.

7. The first food cover of claim 6, the one or more side walls further comprising: one or more venting holes extending through the one or more side walls.

8. The first food cover of claim 6, wherein the first food cover is constructed using a polymer material.

9. The first food cover of claim 6, wherein the top wall of the first food cover is covered by a second food cover comprising:

a top wall having a substantially similar shape to the particular shape of the top wall of the first food cover and having the second area;

one or more side walls slanted at an outward angle from beneath an edge of the top wall of the second food cover, wherein the top wall of the second cover and the one or more side walls of the second form a second cavity, and wherein a bottom edge of the one or more side walls of the second food cover defines substantially similar shape to the particular shape of the top wall of the first food cover and having the third area.

10. The first food cover of claim 9, wherein the top wall of the second food cover further includes venting holes extending through the top wall of the second cover.

11. The first food cover of claim 9, wherein the one or more side walls of the second food cover include a rim, wherein the rim attaches to and extends along the bottom edge of the one or more side walls of the second food cover, wherein the rim includes an internal channel disposed therein, and wherein the internal channel engages the edge of the top wall of the first cover when the one or more sides of the second cover are placed in physical contact with the top wall of the first cover.

12. The first food cover of claim 9, wherein the second cover is constructed using a polymer material.

13. The first food cover of claim 9, wherein the second food cover nests within the first cavity when the first food cover is placed on the second food cover.

14. The first food cover of claim 9, wherein the first food item is positioned within the second cavity when the second food cover is placed on the first food cover within the second cavity when the second food cover is placed on the first food cover.

15. The first food cover of claim 14, wherein when the first food item and the second food item are heated by the microwave oven, food residue from either of the first food item or the second food item is prevented from coming into contact with side and top surfaces in an interior of the microwave oven, and wherein when the first food item is heated by the microwave oven, residue from the first food item is prevent from coming into contact with a bottom surface in the interior of the microwave oven.

* * * * *